United States Patent Office 2,957,836
Patented Oct. 25, 1960

2,957,836

MODIFIED MELAMINE COATING RESINS AND COATING COMPOSITIONS CONTAINING SAME

Harry M. Culbertson, Wilbraham, Mass., and Byron L. Williams, Jr., North Texas City, Tex., assignors to Monsanto Chemical Company, St. Louis, Mo., a corporation of Delaware No Drawing. Filed Dec. 4, 1957, Ser. No. 700,535

11 Claims. (Cl. 260—21)

This invention relates to novel aminoplast resins which are particularly suitable for use in protective coating compositions. More particularly, the invention relates to etherified co-condensation products of melamine, an N-substituted melamine of the group consisting of N,N'-dicyclohexylmelamine, N,N',N''-tricyclohexylmelamine and mixtures thereof and formaldehyde. The invention further relates to protective coating compositions containing such novel aminoplast resins.

BACKGROUND OF THE INVENTION

Etherified melamine-formaldehyde resins have utility in many industrial fields including the protective coating arts. In particular, protective coating compositions containing blends of such etherified melamine-formaldehyde resins and oil-modified alkyd resins have been widely used as baking enamels. Such protective coating compositions have the desirable characteristics of moderately rapid cure, good color retention and good chemical resistance. However, the etherified melamine-formaldehyde resins have limited compatibility with the oil-modified alkyd resins and impair the gloss of the ultimate coatings when used in substantial quantities to effect the maximum improvement in other film properties. The compatibility of etherified melamine-formaldehyde resins with oil-modified alkyd resins can be improved by modifying the etherified melamine-formaldehyde resins with other compounds such as arylsulfonamides. Such modification of the etherified melamine-formaldehyde resins, while improving the resins' compatibility with oil-modified alkyd resins, adversely affects other properties of the protective coating compositions, particularly the rate of cure. Thus, in preparing protective coating compositions containing an etherified melamine-formaldehyde resin, the art must choose between formulations having fast cures and low gloss or formulations having good gloss, but slow cures and low detergent resistance.

Accordingly, it is an object of this invention to provide aminoplast resins having improved properties.

Another object of the invention is to provide novel aminoplast resins which are particularly suitable for use in protective coating compositions.

A further object of the invention is to provide novel aminoplast resins which are compatible with oil-modified alkyd resins of all oil lengths.

Yet another object of the invention is to provide protective coating compositions containing novel aminoplast resins.

Other objects and advantages of the invention will be apparent from the following detailed descriptions thereof.

SUMMARY OF THE INVENTION

In accordance with this invention there are provided novel aminoplast resins which comprise an etherified reaction product of at least 4 mols of a monohydric alcohol containing 1–6 carbon atoms and a co-condensation product of 1 mol of melamine, 0.02–1.0 mol of an N-substituted melamine of the group consisting of N,N'-dicyclohexylamine, N,N',N''-tricyclohexylmelamine and mixtures thereof and at least 4 mols of formaldehyde. In another embodiment of the invention there are provided protective coating compositions which contain an aminoplast resin of the type described above and an oil-modified alkyd resin. The invention further relates to protective coating compositions containing (1) an aminoplast resin of the type described above, (2) an etherified melamine-formaldehyde resin, and (3) an oil-modified alkyd resin.

EXPERIMENTAL

The following examples are set forth to illustrate more clearly the principle and practice of this invention to those skilled in the art. Unless otherwise stated, where quantities are mentioned they are parts by weight.

Example I

Reactants consisting of 126 parts (1 mol) of melamine, 37 parts (0.1 mol) of N,N',N''-tricyclohexylmelamine, 486 parts (6 mols) of formalin (37% formaldehyde), 600 parts (8 mols) of n-butanol and 4 parts of a 5% aqueous NaOH solution are charged to a reaction vessel equipped with a stirrer and a condenser that is fitted with a decanting esterification head. The alkaline solution (pH=10.5) is refluxed for 1.0 hour with all of the condensate being returned to the reaction flask.

After adjusting the pH of the system to 6.4 with oxalic acid, the reaction mixture is again heated to reflux. During this phase of the reaction, the decanting head is set to continuously remove the water phase which separates in the distillation head and to return the butanol phase to the reaction flask. A total of 300 parts of water phase is removed over a five-hour period. The balance of the water remaining in the reaction mixture is removed by refluxing the reaction mixture with the esterification head being set for total takeoff. The distillation is continued until the boiling point of the distillate rises to 108° C. This step requires about 0.5 hour and a total of 170 parts of distillate are collected. As the distillate is removed, an equivalent quantity of dry butanol is continuously added to the reaction flask. After cooling, the butanol is removed by vacuum distillation and the resin is recovered as a heavy viscous liquid.

Example II

Example I is repeated except that the quantity of the N,N',N''-tricyclohexylmelamine charged to the reaction is increased to 110 parts (0.3 mol). The resin is obtained as a thick viscous liquid.

Example III

Reactants comprising 126 parts (1 mol) of melamine, 37 parts (0.1 mol) of N,N',N''-tricyclohexylmelamine, and 486 parts (6 mols) of formalin (37% formaldehyde) are charged to the reaction vessel described in Example I. After adjusting the pH to 9.0 with NaOH, the reaction slurry is heated to reflux for 0.5 hour. There is then added to the reaction flask 600 parts (8 mols) of n-butanol and the pH of the solution is adjusted to 6.0 with oxalic acid. Thereafter, the resin is etherified, dehydrated and recovered by the procedure described in Example I.

Example IV

Example I is repeated except that isobutanol is employed in lieu of n-butanol.

Example V

Example II is repeated except that isobutanol is employed in lieu of n-butanol.

Example VI

Example I is repeated except that 29 parts (0.1 mol) of N,N'-dicyclohexylmelamine are employed in lieu of the N,N',N''-tricyclohexylmelamine.

Example VII

Example II is repeated except that a mixture of 44 parts (0.15 mol) of N,N'-dicyclohexylmelamine and 55 parts (0.15 mol) of N,N',N''-tricyclohexylmelamine is employed in lieu of the N,N',N''-tricyclohexylmelamine.

Example VIII

Example I is repeated except that the quantity of N,N',N''-tricyclohexylmelamine employed is reduced to 18 parts (0.05 mol).

Example IX

The following protective coating compositions are prepared in which the figures listed are parts by weight:

| Component | Coating Composition | | | | | | |
|---|---|---|---|---|---|---|---|
| | A | B | C | D | E | Control I | Control II |
| Resin Example I | 10 | | | | | | |
| Resin Example II | | 10 | | | | | |
| Resin Example III | | | 10 | | | | |
| Resin Example IV | | | | 10 | | | |
| Resin Example V | | | | | 10 | | |
| Prior Art Resin 1 | | | | | | 10 | |
| Prior Art Resin 2 | | | | | | | 10 |
| Alkyd Resin | 20 | 20 | 20 | 20 | 20 | 20 | 20 |
| Titanium Dioxide | 25 | 25 | 25 | 25 | 25 | 25 | 25 |
| Butanol | 10 | 10 | 10 | 10 | 10 | 10 | 10 |
| Xylol | 35 | 35 | 35 | 35 | 35 | 35 | 35 |

The alkyd resin included in the above compositions consists of a blend of two parts of a glyceryl phthalate resin modified with 35 weight percent of coconut oil fatty acids and one part of a glyceryl phthalate resin modified with 40 weight percent of soybean oil fatty acids. Prior art resin 1 included in control I is a commercially available butyl ether of a melamine-formaldehyde resin. Prior art resin 2 included in control II is a commercially available butyl ether of a melamine-formaldehyde resin that is modified with 0.32 mol of toluene sulfonamide per mol of melamine.

A series of steel panels are spray coated with the above coating compositions and the films are cured by heating for, respectively, 30 minutes at 225° F. and 20 minutes at 300° F. The cured films are 2 mils thick. The Sward hardness of each of the films is measured. The detergent resistance of the films cured at 300° F. is measured by ASTM Method D714-45 in which the panels are maintained in an 0.5% aqueous detergent solution for 118 hours at 160° F. The results are set forth in Table I.

| Property— Sward Hardness | Coating Composition | | | | | | |
|---|---|---|---|---|---|---|---|
| | A | B | C | D | E | Control I | Control II |
| 30 min. @ 225° F | 35 | 37 | 35 | 40 | 41 | 24 | 24 |
| 20 min. @ 300° F | 47 | 49 | 48 | 52 | 54 | 40 | 40 |
| Detergent Resistance | [1] N.D. | N.D. | N.D. | N.D. | N.D. | [2] F.T.D. | F.T.D. |

[1] N.D.=No damage to film.
[2] F.T.D.=Film totally destroyed.

The above data indicate that coating compositions containing the novel aminoplast resins of this invention, as compared with coating compositions containing prior art melamine coating resins, (1) cure faster, (2) provide harder films, and (3) provide films having superior detergent resistance.

Example X

Additional steel panels are spray coated with experimental coating compositions A, B, C and control compositions I and II described in Example IX. One series of the panels is cured for 20 minutes at 300° F. and a second series of the panels is baked for 16 hours at 300° F. The panels are examined visually and within each series the gloss obtained with the experimental coating compositions is at least equal to and in some cases superior to the gloss obtained with the two control compositions. These data establish that the initial gloss and the gloss retention on overbaking of the experimental coating compositions are fully equivalent to the two control coating compositions. This showing is highly significant, since the control compositions are considered by the art to be excellent with respect to these properties.

Example XI

The following protective coating composition is prepared:

| Component: | Parts |
|---|---|
| Alkyd resin | 15.0 |
| Resin of Example VI | 15.0 |
| Titanium dioxide | 15.0 |
| Lampblack | 0.2 |
| Xylol | 40.0 |
| Butanol | 15.0 |

The alkyd resin included in the above formulation is a glyceryl phthalate resin modified with about 42 weight percent of dehydrated castor oil fatty acids. The coating composition is sprayed onto a steel panel and baked for 20 minutes at 300° F. The resulting film is very hard and has high gloss and good detergent resistance.

Example XII

Eight unpigmented, clear baking varnishes are prepared by including each of the resins of Examples I-VIII in the following formulation:

| Component: | Parts |
|---|---|
| Alkyd resin | 27.00 |
| Aminoplast resin | 3.00 |
| Hydrocarbon solvent | 50.00 |
| Butanol | 5.00 |
| Cobalt naphthenate | 0.06 |

The alkyd resin included in the formulation is a glyceryl phthalate resin modified with about 62 weight percent of soybean oil fatty acids. The hydrocarbon solvent is a commercial mixture of petroleum aliphatic hydrocarbons. The varnishes are sprayed onto steel panels and baked for 20 minutes at 300° F. to provide hard films having high gloss and good detergent resistance.

Example XIII

A protective coating composition having good properties is obtained with the following formulation:

| Component: | Parts |
|---|---|
| Alkyd resin | 20 |
| Resin of Example II | 5 |
| Butyl ether of a melamineformaldehyde resin | 5 |
| Titanium dioxide | 25 |
| Butanol | 5 |
| Xylol | 40 |

The alkyd resin employed is described in Example IX and the butyl ether of the melamine-formaldehyde resin is prior art resin 2 described in Example IX.

DISCUSSION

The aminoplast resins of this invention are the etherified reaction product of at least 4 mols of a monohydric alcohol containing 1-6 carbon atoms and a co-condensation product of 1 mol of melamine, 0.02-1.0 mol of an N-substituted melamine of the group consisting of N,N'-dicyclohexylmelamine, N,N',N'' - tricyclohexylmelamine and mixtures thereof, and at least 4 mols of formaldehyde. In a preferred embodiment of the invention, the aminoplast resins are the etherified reaction product of a butanol and a co-condensation product of melamine, N,N',N''-tricyclohexylmelamine and formaldehyde.

The co-condensates employed in the invention are prepared by heating the melamine, the N-substituted melamine and the formaldehyde under alkaline conditions, e.g., at a pH of 8.5-10.5, in a suitable solvent such as water, a 1-6 carbon atom monohydric alcohol or a water-alcohol mixture. The quantity of N-substituted melamine employed is 0.02-1.0 or preferably 0.05-0.5 mol per mol of melamine. The minimum quantity of formaldehyde employed is at least 4 mols per mol of melamine, but preferably the formaldehyde is employed in a quantity sufficient to react with each of the reactive hydrogen atoms contained in the melamine and the N-substituted melamine. In calculating the quantity of formaldehyde to be employed, melamine contains 6 reactive hydrogen atoms, N,N'-dicyclohexylmelamine contains 4 reactive hydrogen atoms and N,N',N''-tricyclohexylmelamine contains 3 reactive hydrogen atoms. The N,N'-dicyclohexylmelamine employed in the invention may be obtained by reacting 2 mols of cyclohexylamine with 1 mol of 2,4-dichloro-6-amino-s-triazine and the N,N',N''-tricyclohexylmelamine may be obtained by reacting 3 mols of cyclohexylamine with 1 mol of cyanuric chloride. Alternatively, both of these compounds may be prepared by the method disclosed in U.S. Patent 2,361,823.

The etherified resins are prepared by heating the co-condensate of melamine, the N-substituted melamine and formaldehyde with at least 4 mols of a monohydric alcohol containing 1-6 or preferably 3-6 carbon atoms under acid conditions, e.g., at a pH of about 5.5-7.0. During this reaction, the co-condensation product is both etherified and polymerized. Thus, the alcohol functions as both a reactant and as a solvent for the reaction. Preferably, the reaction is carried out under reflux conditions (at either atmospheric or reduced pressure) so that water may be removed from the reaction system by azeotropic distillation. To maintain the minimum quantity of alcohol required in the reaction system when operating under reflux conditions, it is necessary to (1) return the distilled alcohol to the reaction system, or (2) add alcohol to the reaction system as makeup, or (3) initially charge a large excess of alcohol to the reaction. Essentially any 1-6 carbon atom monohydric alcohol such as methanol, ethanol, propanol or hexanol may be employed in the etherification reaction. The alcohol employed will be influenced to a large degree by the use that is to be made of the resin. Where the resin is to be employed in protective coating compositions, it is preferred to use n-butanol or especially isobutanol for this purpose. When isobutanol is employed as the etherifying alcohol, the pH of the system during the etherification reaction must be maintained within the limits of about 5.8-7.0 or preferably 6.0-6.5. After the etherification reaction is complete, the resin solution may be concentrated to the desired solids level or recovered in solvent-free form by removing the solvent alcohol by vacuum distillation.

The resins of the invention may be used in the manufacture of textile printing pastes, as an ingredient in adhesive formulations, in the resin finishing of textiles (especially cottons), e.g., by methods analogous to those disclosed in U.S. 2,661,262 and U.S. 2,661,313, etc. The resins also may be used per se or in conjunction with other film-forming resins in the preparation of protective coating compositions.

The present invention is also concerned with protective coating compositions which contain as the film-forming polymers a binary mixture of an aminoplast resin of the type herein described and an oil-modified alkyd resin. The novel aminoplast resins are compatible with alkyd resins of all oil lengths in virtually all proportions. Preferably, however, the resinous components of the coating compositions of primary concern consist of 10-50 weight percent of the aminoplast resin and, correspondingly, 90-50 weight percent of the oil-modified alkyd resin.

The invention further relates to protective coating compositions which contain as the film-forming polymers a ternary mixture of (1) an oil-modified alkyd resin, (2) a novel aminoplast resin of the type herein described, and (3) an etherified melamine-formaldehyde resin. The oil-modified alkyd resin ordinarily will constitute 50-90 weight percent of the total of the 3 film-forming polymers. The novel aminoplast resin in turn ordinarily will constitute at least 20 weight percent and preferably 20-75 weight percent of the binary mixture of the novel aminoplast resin and the etherified melamine-formaldehyde resin.

The etherified melamine-formaldehyde resins included in the protective coating compositions described in the paragraph above are known in the art. Chemically, these resins are the etherified reaction product of at least 4 mols of a monohydric alcohol containing 1-6 or preferably 3-6 carbon atoms and a condensation product of 1 mol of melamine and at least 3 mols of formaldehyde. Preferably, the monohydric alcohol employed to etherify the melamine-formaldehyde condensate is a butanol such as n-butanol or isobutanol. If desired, the etherified melamine-formaldehyde resin may be modified with minor amounts of other compounds containing amino hydrogen atoms, e.g., an arylsulfonamide.

The alkyd resins included in the protective coating compositions of the invention are condensates of polyhydric alcohols such as glycols, glycerol, sorbitol, pentaerythritol, etc. with polybasic acids or anhydrides thereof, e.g., phthalic acid, phthalic anhydride, isophthalic acid, azelaic acid, etc. These alkyd resins are modified with drying, semi-drying and non-drying oils such as coconut oil, castor oil, dehydrated castor oil, soybean oil, linseed oil, tung oil, or the acids and glycerides derived therefrom. The oil-modified alkyd resins having the best balance of properties for inclusion in the protective coating compositions of the invention contain 30-70 and preferably 30-40 weight percent of combined fatty acids. As is known, such acids contain about 12-20 carbon atoms.

The protective coating compositions of interest ordinarily will comprise 20-70% of the mixture of the aminoplast resin (or resins) and the oil-modified alkyd resin dissolved in a suitable organic solvent such as hydrocarbons, alcohols, ethers, ketones, esters, and mixtures thereof, e.g., xylol-butanol and aliphatic hydrocarbon-butanol mixtures. Pigments, driers and other conventional ingredients may be included in the coating compositions. Such compositions usually will be formulated to have a total solids content of about 40-60%.

The coating compositions of the invention may be advantageously employed to protect wooden, paper and metal surfaces. The coating compositions may be applied to the surfaces to be protected by conventional methods of application such as brushing, spraying, roll coating, dipping, etc. The films may be cured by heating for short periods of time at 180-400° F.

The above descriptions and particularly the examples are set forth by way of illustration only. Many other variations and modifications of the invention will be ap-

What is claimed is:

1. A resin comprising an etherified reaction product of at least 4 mols of a monohydric acyclic alcohol containing 1–6 carbon atoms and a co-condensation product of 1 mol of melamine, 0.02–1.0 mol of an N-substituted melamine of the group consisting of N,N'-dicyclohexylmelamine, N,N',N"-tricyclohexylmelamine and mixtures thereof, and at least 4 mols of formaldehyde.

2. A resin comprising an etherified reaction product of at least 4 mols of a butanol of the group consisting of n-butanol, isobutanol and mixtures thereof, and a co-condensation product of 1 mol of melamine, 0.02–1.0 mol of an N-substituted melamine of the group consisting of N,N'-dicyclohexylmelamine, N,N',N"-tricyclohexylmelamine and mixtures thereof, and at least 4 mols of formaldehyde.

3. A resin comprising an etherified reaction product of at least 4 mols of a butanol of the group consisting of n-butanol, isobutanol and mixtures thereof, and a co-condensation product of 1 mol of melamine, 0.05–0.5 mol of N,N',N"-tricyclohexylmelamine and at least 4 mols of formaldehyde.

4. A process for preparing a resin which comprises heating 1 mol of melamine, 0.02–1.0 mol of an N-substituted melamine of the group consisting of N,N'-dicyclohexylmelamine, N,N',N"-tricyclohexylmelamine and mixtures thereof, and at least 4 mols of formaldehyde in an aqueous medium under alkaline conditions to co-condense said reactants and then etherifying said co-condensation product by heating said co-condensation product and at least 4 mols of a monohydric acyclic alcohol containing 1–6 carbon atoms to substantially atmospheric reflux temperature under acidic conditions.

5. A method for preparing a resin which comprises heating 1 mol of melamine, 0.02–1.0 mol of N,N',N"-tricyclohexylmelamine and at least 4 mols of formaldehyde in an aqueous medium under alkaline conditions to co-condense said reactants and then etherifying said co-condensation product by heating said co-condensation product and at least 4 mols of a butanol of the group consisting of n-butanol, isobutanol and mixtures thereof, to substantially atmospheric reflux temperature while maintaining the pH of the solution in the range of 5.5–7.0.

6. A method for preparing a resin which comprises heating 1 mol of melamine, 0.02–1.0 mol of N,N',N"-tricyclohexylmelamine and at least 4 mols of formaldehyde in an aqueous medium under alkaline conditions to co-condense said reactants and then etherifying said co-condensation product by heating said co-condensation product and at least 4 mols of isobutanol to substantially atmospheric reflux temperature while maintaining the pH of the solution in the range of 5.8–7.0.

7. A protective coating composition comprising an organic solvent solution of a mixture of an oil-modified alkyd resin and an etherified reaction product of at least 4 mols of a monohydric acyclic alcohol containing 1–6 carbon atoms and a co-condensation product of 1 mol of melamine, 0.02–1.0 mol of an N-substituted melamine of the group consisting of N,N'-dicyclohexylmelamine, N,N',N"-tricyclohexylmelamine and mixtures thereof, and at least 4 mols of formaldehyde.

8. A protective coating composition as in claim 7 wherein the oil-modified alkyd resin contains 30–70 weight percent of combined fatty acid moiety.

9. A protective coating composition comprising an organic solvent solution of a mixture of 50–90 weight percent of an oil-modified alkyd resin and, correspondingly, 50–10 weight percent of an etherified reaction product of at least 4 mols of a butanol of the group consisting of n-butanol, isobutanol and mixtures thereof and a co-condensation product of 1 mol of melamine, 0.05–0.5 mol of N,N',N"-tricyclohexylmelamine and at least 4 mols of formaldehyde.

10. A protective coating composition comprising an organic solvent solution of a ternary mixture of (1) an oil-modified alkyd resin, (2) an etherified reaction product of at least 4 mols of a monohydric acyclic alcohol containing 1–6 carbon atoms and a co-condensation product of 1 mol of melamine, 0.02–1.0 mol of an N-substituted melamine of the group consisting of N,N'-dicyclohexylmelamine, N,N',N"-tricyclohexylmelamine and mixtures thereof and at least 4 mols of formaldehyde, and (3) an etherified reaction product of at least 4 mols of a monohydric acyclic alcohol containing 1–6 carbon atoms and a condensation product of 1 mol of melamine and at least 3 mols of formaldehyde; said oil-modified alkyd resin constituting 50–90 weight percent of the total of (1), (2) and (3); said component (2) constituting at least 20 weight percent of the total of (2) and (3).

11. A protective coating composition comprising an organic solvent solution of a ternary mixture of (1) an oil-modified alkyd resin, (2) an etherified reaction product of at least 4 mols of a butanol of the group consisting of n-butanol, isobutanol and mixtures thereof and a co-condensation product of 1 mol of melamine, 0.05–0.5 mol of N,N',N"-tricyclohexylmelamine and at least 4 mols of formaldehyde, and (3) an etherified reaction product of at least 4 mols of a butanol of the group consisting of n-butanol, isobutanol and mixtures thereof and a condensation product of 1 mol of melamine and at least 3 mols of formaldehyde; said oil-modified alkyd resin constituting 50–90 weight percent of the total of (1), (2) and (3); said component (2) constituting at least 20 weight percent of the total of (2) and (3).

References Cited in the file of this patent

UNITED STATES PATENTS

| | | |
|---|---|---|
| Re. 24,351 | Varela et al. | Aug. 27, 1957 |
| 2,197,357 | Widmer et al. | Apr. 16, 1940 |
| 2,209,292 | Berger | July 23, 1940 |
| 2,294,590 | West | Sept. 1, 1942 |
| 2,508,876 | Scott et al. | May 23, 1950 |
| 2,545,049 | Schaefer et al. | Mar. 13, 1951 |

UNITED STATES PATENT OFFICE
CERTIFICATION OF CORRECTION

Patent No. 2,957,836                          October 25, 1960

Harry M. Culbertson et al.

It is hereby certified that error appears in the above numbered patent requiring correction and that the said Letters Patent should read as corrected below.

Column 2, line 1, for "dicyclohexylamine" read -- dicyclohexylmelamine --.

Signed and sealed this 2nd day of May 1961.

(SEAL)
Attest:

ERNEST W. SWIDER                                   DAVID L. LADD
Attesting Officer                                   Commissioner of Patents